Figure 1:
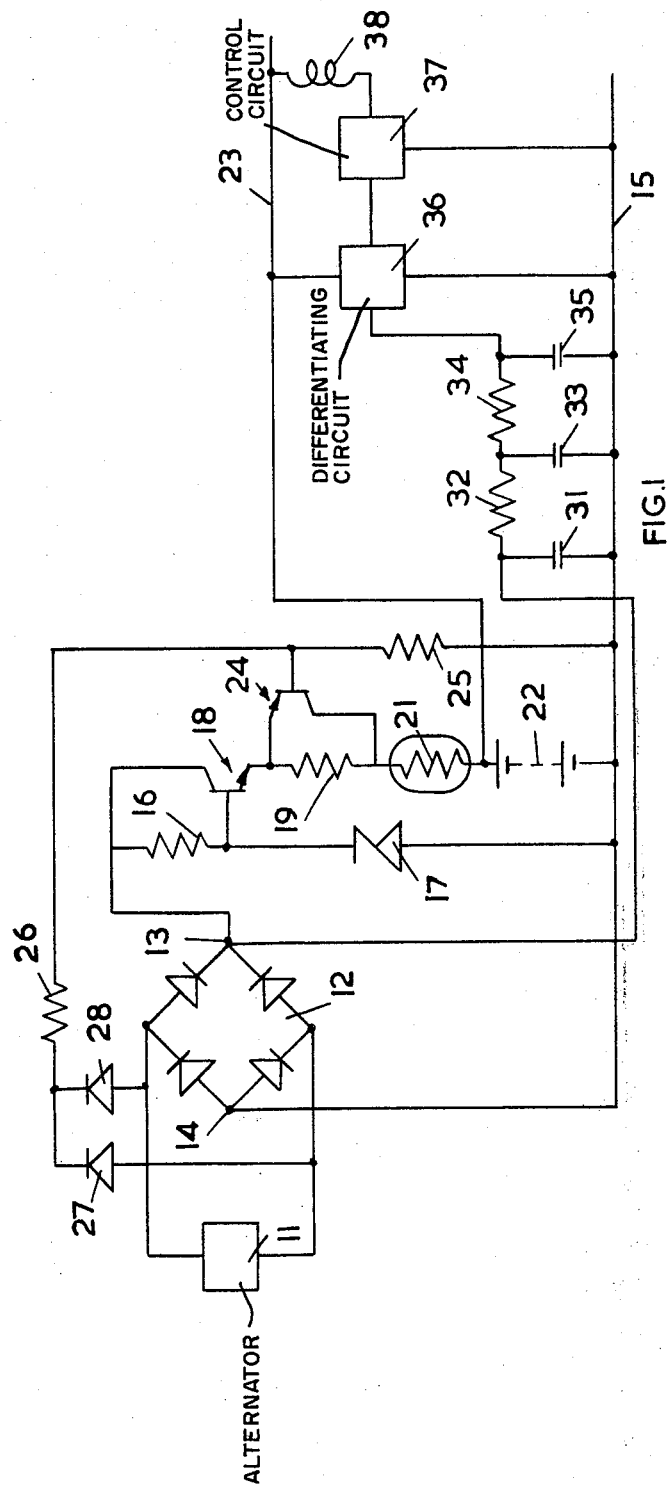

United States Patent [19]
Hardy

[11] 3,901,560
[45] Aug. 26, 1975

[54] WHEEL SLIDE PROTECTION SYSTEM

[75] Inventor: Michael William Hardy, Water Orton, England

[73] Assignee: Girling Limited, Birmingham, England

[22] Filed: July 18, 1973

[21] Appl. No.: 380,223

[30] Foreign Application Priority Data
July 18, 1972  United Kingdom............... 33516/72
Aug. 5, 1972  United Kingdom............... 36678/72

[52] U.S. Cl.............. 303/21 CG; 188/181 A; 320/2
[51] Int. Cl.².......................................... B60T 8/08
[58] Field of Search............... 180/82 R; 188/181 A; 303/20, 21; 320/2, 21–22, 35, 41, 51, 61, DIG. 1; 324/162; 340/52 R, 262; 317/5

[56] References Cited
UNITED STATES PATENTS

| | | | |
|---|---|---|---|
| 3,608,979 | 9/1971 | Coyle.............................. | 303/21 EB |
| 3,656,044 | 4/1972 | King......................................... | 320/2 |
| 3,740,636 | 6/1973 | Hogrefe et al.......................... | 320/2 |
| 3,757,166 | 9/1973 | Clifford et al............. | 303/21 CG X |

FOREIGN PATENTS OR APPLICATIONS
1,959,971  6/1970  Germany............................... 320/2

*Primary Examiner*—Trygve M. Blix
*Assistant Examiner*—Stephen G. Kunin
*Attorney, Agent, or Firm*—Holman & Stern

[57] ABSTRACT

A wheel slide protection system, particularly for a rail vehicle, removes the brakes from a wheel when the deceleration of the wheel exceeds a predetermined value. Power for the system is supplied by a battery charged by an alternator driven by the wheel, and a voltage regulator regulates the charging of the battery in accordance with the rotational speed of the wheel. The brakes are released from the wheel in one arrangement by a trigger circuit which switches at the predetermined deceleration.

2 Claims, 2 Drawing Figures

WHEEL SLIDE PROTECTION SYSTEM

This invention relates to wheel slide protection systems for vehicles, particularly, but not exclusively, rail vehicles.

A system according to the invention includes an alternator which in use is driven by a wheel to be controlled, the alternator producing an output which is dependent upon the rotational speed of the wheel, a differentiating circuit to which the output is applied, the differentiating circuit producing an output dependent upon the rotational deceleration of the wheel, control means operable by the output from the differentiating circuit for releasing the brakes from said wheel when the rotational deceleration of the wheel exceeds a predetermined value, and a battery which provides power for the system and is charged by said alternator through a voltage regulator, said voltage regulator regulating the charging of the battery in accordance with the rotational speed of the wheel.

Preferably, the voltage regulator includes a resistor through which the alternator charges the battery, the resistor being bridged by a variable impedance coupled to the alternator, whereby the variable impedance has a value determined by the rotational speed of the wheel.

Preferably, the variable impedance is a transistor which when the rotational speed of the wheel is below a first predetermined value is fully conductive, so that said resistor is short-circuited, and which when the rotational speed of the wheel is above a second and higher predetermined value is off, said transistor presenting a variable impedance between the two predetermined rotational speeds of the wheel to vary the charging rate of the battery.

Preferably, the charging circuit of the battery also includes a temperature-dependent resistor for modifying the charging rate with temperature.

In another aspect, a system according to the invention comprises means operable in use to produce a signal representing the rotational speed of a wheel, a differentiating circuit to which said signal is applied, the differentiating circuit producing an output dependent upon the rotational deceleration of the wheel, a trigger circuit coupled to the output from the differentiating circuit, the trigger circuit changing state when the deceleration of the wheel exceeds a predetermined value, and means operable when the trigger circuit changes state for releasing the brakes from said wheel.

The system specified in the preceding paragraph is primarily intended for an arrangement in which there are at least two brakes operating on the wheel, and both brakes are released when the trigger circuit changes state.

In another aspect, a system as specified above controls acceleration, the differentiating circuit serving to sense the rotational acceleration and the control means being adapted in use to remove power from an accelerating wheel which is about to slip.

Figure 2:
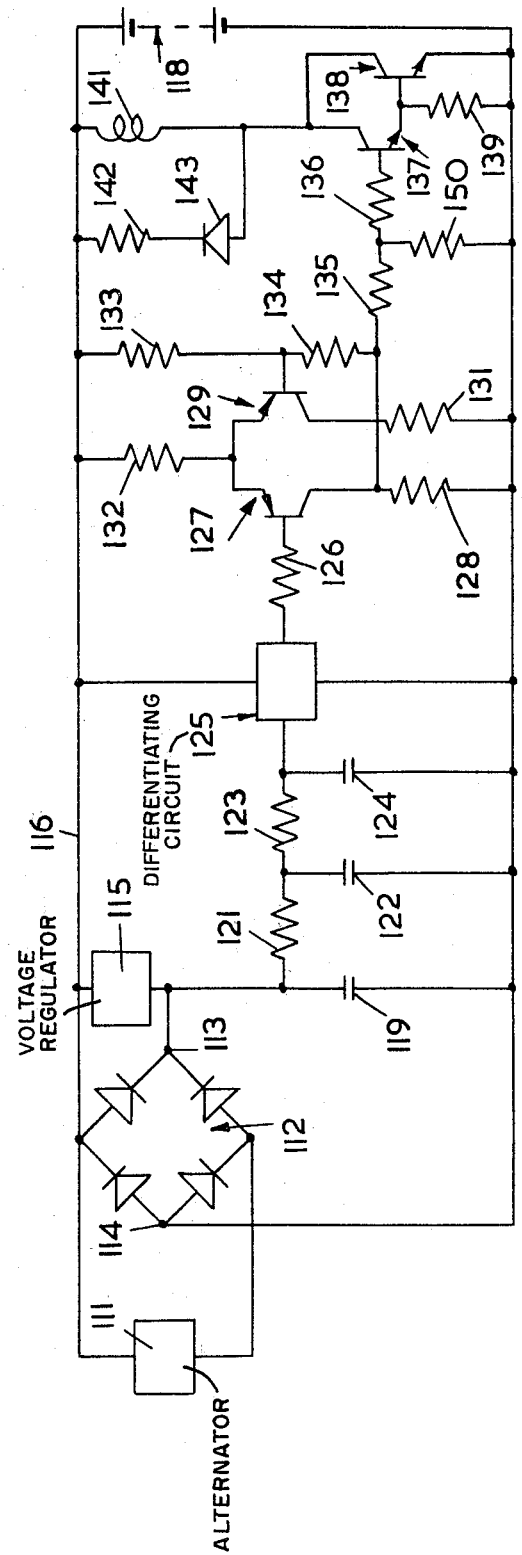

In the accompanying drawings FIGS. 1 and 2 are circuit diagrams illustrating two examples of the invention, as applied to a rail vehicle braking system.

Referring to FIG. 1, the wheel of a rail vehicle drives an alternator 11 providing an input to a full wave rectifier 12 having a positive output terminal 13 and a negative output terminal 14. The terminal 14 is connected to a negative supply line 15, and the terminal 13 is connected to the line 15 through a resistor 16 and a Zener diode 17 in series. The junction of the resistor 16 and Zener diode 17 is connected to the base of an n-p-n transistor 18, the collector of which is connected to the terminal 13 and the emitter of which is connected through a pair of resistors 19, 21 in series to the positive terminal of a battery 22 the negative terminal which is connected to the line 15 and the positive terminal which provides power to a line 23. The resistor 19 is bridged by the emitter collector path of a p-n-p transistor 24, the base of which is connected through a resistor 25 to the line 15, and through a resistor 26 to the cathodes of a pair of diodes 27, 28 the anodes of which are connected to the input terminals of the rectifier 12.

The terminal 13 is further connected to the line 15 through a capacitor 31 which is bridged by a resistor 32 and a capacitor 33 in series, the capacitor 33 being bridged by a resistor 34 and capacitor 35, and the junction of the resistor 34 and capacitor 35 being connected to the input terminal of a differentiating circuit 36 connected between the lines 23, 15. The output terminal of the differentiating circuit 36 is connected to a control circuit 37 connected between the lines 23, 15 and the control circuit 37 provides an output to a winding 38 which when energised removes the brakes from the vehicle.

In use, the alternator 11 charges the battery 22 in a manner to be described, and also produces at the input terminal of the differentiating circuit 36 a signal which is smoothed by the capacitors 31, 33, 35 and resistors 32, 34, and is dependent upon the rotational speed of the wheel. The differentiating circuit 36 produces an output representing the rotational deceleration of the wheel, and this output is applied to the control circuit 37 which when the rotational deceleration of the wheel reaches a value at which the wheel is likely to slip, produces an output to energise the winding 38 and so remove the brakes from the wheel.

The battery 22 is charged by the transistor 18, the base voltage of which is held constant by the Zener diode 17, so that the charging rate of the battery 22 is dependent upon the resistor 19 and the resistor 21. The resistor 21 is a temperature-sensitive resistor which compensates for changes in temperature. The resistor 19 ensure that the battery 22 is adequately charged at low rotational speeds of the wheel, but is not overcharged at higher wheel speeds. Thus, when the wheel speed is below a first predetermined value, then the potential at the cathodes of the diodes 27 and 28 is low, and current can flow from the terminal 13 through the transistor 18 and through the emitter-base path of the transistor 24 and the resistor 25 to turn on the transistor 24. At this stage the transistor 24 is saturated, and short-circuits the resistor 19. At a second and high predetermined rotational speed of the wheel, however, the potential at the cathodes of the diodes 27 and 28 is sufficient to turn off the transistor 24, so that the full impedance of the resistor 19 is presented to the battery 22. Between the two predetermined wheel speeds, the transistor 24 will have an impedance which varies with the rotational speed of the wheel, and so modifies the effective impedance of the resistor 19 to regulate the charging of the battery 22.

Preferably, the control circuit 37 includes a Schmitt trigger circuit which switches at the predetermined rotational deceleration of the wheel, and operates the winding 38 through an amplifier.

It will be appreciated that the circuit is entirely self-contained, and so is particularly suitable for use on rail vehicles.

The circuit can also control acceleration, either as well as, or instead of deceleration. For this purpose, the differentiating circuit produces an output representing rotational deceleration, and when this output reaches a predetermined level, then the control circuit operates means for removing power from the wheel.

Referring now to FIG. 2, a wheel of a rail vehicle drives an alternator 111 which provides an input to a full wave rectifier 112 having output terminals 113 and 114. The terminal 113 is connected through a voltage regulator 115 to a positive supply line 116, and the terminal 114 is connected to a negative supply line 117. A rechargeable battery 118 is connected between the lines 116 and 117.

The terminal 113 is further connected to the line 117 through a capacitor 119 which is bridged by a resistor 121 and a capacitor 122 in series. The capacitor 122 is bridged by a resistor 123 and a capacitor 124 in series, and the junction of the resistor 123 and the capacitor 124 is connected to the input of a differentiating circuit 125 connected between the lines 116, 117. The output terminal of the differentiating circuit 125 is connected through a resistor 126 to the base of a p-n-p transistor 127 having its collector connected through a resistor 128 to the line 117, and there is further provided a p-n-p transistor 129, the collector of which is connected through a resistor 131 to the line 117. The emitters of the transistors 127 and 129 are connected through a resistor 132 to the line 116, and the base of the transistor 129 is connected to the line 116 through a resistor 133, and to the base of an n-p-n transistor 137 through a series circuit including resistors 134, 135 and 136. The junction of the resistors 134 and 135 is connected to the collector of the transistor 127, and the junction of the resistors 135, 136 is connected to the line 117 through a resistor 150.

The emitter of the transistor 137 is connected to the base of an n-p-n transistor 138 having its emitter connected to the line 117 and its base connected to the line 117 through a resistor 139. The collectors of the transistor 137 and 138 are connected to the line 116 through a winding 141 which is bridged by a resistor 142 in series with a freewheel diode 143.

In use, the alternator 111 produces an output having an amplitude dependent upon the rotational speed of the wheel, and the rectified output from the alternator is regulated by the voltage regulator 115 and serves to charge the battery 118, so that the entire system is self-contained. The unregulated output from the rectifier 112 is smoothed by the capacitors 119, 112 and 124 and fed to the differentiating circuit 125, which produces an output representing the rotational deceleration of the wheel. As long as the rotational deceleration of the wheel is below a predetermined value, the output from the differentiating circuit 125 is insufficient to turn on the transistor 127, so that the transistor 129 is on, the Zener diode 136 is off and the Darlington pair 137, 138 is off. However, when the predetermined deceleration is reached, the transistor 127 is turned on, and the Schmitt trigger circuit constituted by the transistors 127, 129 and their associated resistors switches in the usual way so that the transistor 129 is off, and the transistors 137 and 138 turn on and energise the winding 141.

When the deceleration falls, the Schmitt trigger circuit will change state again to turn off the transistors 137 and 138, but the voltage at which the Schmitt trigger circuit reverts to its original state is lower than the voltage at which it first switches.

The winding 141 removes the brakes from the wheel, and the system is particularly designed where there are at least two separate brakes acting on the wheel. In one arrangement, the winding 141 operates two separate contacts which in turn energise two electro-pneumatic valves for removing from the wheel both a disc brake and a tread brake. The winding 141 may also operate another contact for operating a further valve which operates wheel sanding equipment associated with the wheel.

In another arrangement, acceleration of the wheel is controlled. In this case, the differentiating circuit 125 serves to switch a Schmitt trigger circuit when the acceleration of the wheel exceeds a value at which the wheel is likely to slip, and the winding 141 serves to remove power from the wheel. The output from the differentiating circuit 125 can be used with two Schmitt trigger circuits and associated components to control both acceleration and deceleration.

I claim:

1. A wheel slide protection system for a vehicle, including an alternator which in use is driven by a wheel to be controlled, the alternator producing an output which is dependent upon the rotational speed of the wheel, a differentiating circuit to which the output is applied, the differentiating circuit producing an output dependent upon the rotational deceleration of the wheel, control means operable by the output from the differentiating circuit for releasing the brakes from said wheel when the rotational deceleration of the wheel exceeds a predetermined value, a battery which provides power for the system and is charged by said alternator through a voltage regulator, said voltage regulator including a resistor through which the alternator charges the battery, and a transistor bridging said resistor and coupled to the alternator whereby when the rotational speed of the wheel is below a first predetermined value the transistor is fully conductive, so that the resistor is short-circuited, and when the rotational speed of the wheel is above a second and higher predetermined value, said transistor is off, said transistor presenting a variable impedance between the two predetermined rotational speeds of the wheel to vary the charging rate of the battery.

2. A system as claimed in claim 1 in which the charging circuit of the battery also includes a temperature-dependent resistor for modifying the charging rate with temperature.

* * * * *